(12) United States Patent
Ji et al.

(10) Patent No.: US 11,873,803 B2
(45) Date of Patent: *Jan. 16, 2024

(54) CONTINUOUS HIGH-POWER TURBINE FRACTURING EQUIPMENT

(71) Applicant: AMERICAN JEREH INTERNATIONAL CORPORATION, Houston, TX (US)

(72) Inventors: Xiaolei Ji, Yantai (CN); Rikui Zhang, Yantai (CN); Peng Zhang, Yantai (CN); Chunqiang Lan, Yantai (CN); Zhuqing Mao, Yantai (CN); Jianwei Wang, Yantai (CN); Mingchao Mao, Yantai (CN)

(73) Assignee: American Jereh International Corporation, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/210,032

(22) Filed: Mar. 23, 2021

(65) Prior Publication Data
US 2021/0285432 A1    Sep. 16, 2021

Related U.S. Application Data

(63) Continuation of application No. 16/816,262, filed on Mar. 12, 2020, now Pat. No. 10,961,993.

(51) Int. Cl.
*F04B 17/06*    (2006.01)
*F16H 57/04*    (2010.01)
(Continued)

(52) U.S. Cl.
CPC .............. *F04B 17/06* (2013.01); *F04B 23/06* (2013.01); *F04B 53/18* (2013.01); *F16H 57/0412* (2013.01)

(58) Field of Classification Search
CPC .......... F04B 17/00; F04B 17/03; F04B 17/06; F04B 23/00; F04B 23/025; F04B 23/04;
(Continued)

(56) References Cited

U.S. PATENT DOCUMENTS 2,350,102 A    5/1944  Fairbanks
2,535,703 A *  12/1950 Smith .................. F16H 57/0456
                                                184/6.12
(Continued)

FOREIGN PATENT DOCUMENTS

CN    201810502 U    4/2011
CN    103629267 A    3/2014
(Continued)

OTHER PUBLICATIONS

Chinese Search Report dated Mar. 10, 2022 for Chinese Application No. 202210240946.X; 2 pages.
(Continued)

*Primary Examiner* — Charles G Freay
*Assistant Examiner* — Chirag Jariwala
(74) *Attorney, Agent, or Firm* — Crowell & Moring LLP

(57) ABSTRACT

The present invention discloses a continuous high-power turbine fracturing equipment, including a turbine engine, a reduction gearbox, a drive shaft and a plunger pump, the turbine engine is arranged in the same straight line with the reduction gearbox, the reduction gearbox is connected to the plunger pump through the drive shaft, the angle of the drive shaft is between 2° and 4°. The beneficial effects are as follows: chassis T1 materials are selected to provide a stable working platform for the equipment; the turbine engine is arranged in the same straight line with the reduction gearbox, the drive shaft is disposed between the reduction gearbox and the plunger pump, and the angle of the drive shaft is between 2° and 4°, ensuring stable and efficient (Continued)

transmission of the turbine engine, thus reducing the incidence of failure; a lubrication system driven by an auxiliary power system ensures that the turbine engine, the reduction gearbox and the plunger pump all run under appropriate circumstances, and a dual lubrication system ensures that the plunger pump achieves a power operation continuously at 5000 HP or above; with all the above technical means, the requirements of continuous high-power operations for the fracturing equipment would finally be satisfied.

19 Claims, 2 Drawing Sheets

(51) Int. Cl.
    *F04B 23/06*      (2006.01)
    *F04B 53/18*      (2006.01)
(58) Field of Classification Search
    CPC .......... F04B 23/06; F04B 47/00; F04B 53/18; E21B 4/003; E21B 7/02; E21B 43/12; E21B 43/26; E21B 43/2607; F16H 57/0412
    See application file for complete search history.

(56)  References Cited

U.S. PATENT DOCUMENTS

| | | | |
|---|---|---|---|
| 8,801,394 | B2 | 8/2014 | Anderson |
| 10,280,725 | B2 | 5/2019 | Jiang |
| 10,989,180 | B2 | 4/2021 | Yeung et al. |
| 2014/0048268 | A1* | 2/2014 | Chandler ............ E21B 43/2405 166/303 |
| 2014/0237966 | A1 | 8/2014 | Chin et al. |
| 2014/0250845 | A1 | 9/2014 | Jackson et al. |
| 2015/0252661 | A1 | 9/2015 | Glass |
| 2016/0177945 | A1* | 6/2016 | Byrne .................... F04B 53/18 184/6 |
| 2016/0369609 | A1 | 12/2016 | Morris et al. |
| 2017/0037717 | A1* | 2/2017 | Oehring .................. F04B 23/04 |
| 2017/0089189 | A1 | 3/2017 | Norris et al. |
| 2017/0370524 | A1 | 12/2017 | Wagner |
| 2018/0298731 | A1* | 10/2018 | Bishop ..................... H02J 3/381 |
| 2018/0328157 | A1* | 11/2018 | Bishop ..................... E21B 43/26 |
| 2019/0063263 | A1* | 2/2019 | Davis ....................... E21B 43/26 |
| 2019/0153843 | A1 | 5/2019 | Headrick |
| 2019/0154020 | A1* | 5/2019 | Glass ....................... F04B 17/03 |
| 2019/0338762 | A1* | 11/2019 | Curry ....................... F04B 17/06 |
| 2020/0223648 | A1 | 7/2020 | Herman et al. |
| 2020/0325761 | A1 | 10/2020 | Williams |
| 2020/0362678 | A1 | 11/2020 | Lesko |
| 2021/0079849 | A1 | 3/2021 | Yeung |
| 2021/0087916 | A1* | 3/2021 | Zhang ................... B62D 53/062 |
| 2021/0148349 | A1* | 5/2021 | Nowell ................. F04B 53/164 |
| 2021/0207588 | A1 | 7/2021 | Yeung et al. |

FOREIGN PATENT DOCUMENTS

| | | |
|---|---|---|
| CN | 204611308 U | 9/2015 |
| CN | 105972194 A | 9/2016 |
| CN | 111188763 A | 5/2020 |
| CN | 111536087 A | 8/2020 |
| CN | 112833316 A | 5/2021 |
| WO | WO 2011-048186 A1 | 4/2011 |

OTHER PUBLICATIONS

Chinese Search Report dated Oct. 25, 2022 for Chinese Application No. 202210240946.X; 3 pages.

Weir Oil & Gas Introduces Industry's First Continuous Duty 5000-Horsepower Pump Specifically Designed for Electric or Gas Turbine-Driven Applications by Weir Oil & Gas, GlobalNewswire, Jul. 25, 2019. https://www.globenewswire.com/news-release/2019/07/25/1888087/0/en/Weir-Oil-Gas-Introduces-Industry-s-First-Continuous-Duty-5000-Horsepower-Pump-Specifically-Designed-for-Electric-or-Gas-Turbine-Driven-Applications.html.

* cited by examiner

CONTINUOUS HIGH-POWER TURBINE FRACTURING EQUIPMENT

CROSS-REFERENCE TO RELATED APPLICATION

The present application is a continuation of U.S. application Ser. No. 16/816,262, filed Mar. 12, 2020, the entire contents of which are incorporated herein by reference.

TECHNICAL FIELD

The present invention relates to the technical field of turbine fracturing, and specifically to a continuous high-power turbine fracturing equipment.

BACKGROUND

Traditional fracturing equipment used in oil and gas fields are mainly diesel-driven fracturing equipment and electric-driven fracturing equipment. With the development of science and technology, turbine engines used in aviation have also been applied on fracturing equipment. As the current technologies on turbine engine applications and fracturing operation in oil and gas fields are not mature, it is difficult to realize the stable output of turbine engines, and so far the co-use of turbine engines and high-power plunger pumps is still a blank spot, resulting in low output power of the whole equipment, which cannot meet the current requirements of continuously stable and high-power operations for well sites in oil and gas fields.

Therefore, a continuous high-power output turbine fracturing equipment is urgently needed to satisfy the current demands of well sites in oil and gas fields.

SUMMARY

To overcome the deficiencies in the prior art, an objective of the present invention is to provide a continuous high-power turbine fracturing equipment, in which chassis T1 materials are selected to provide a stable working platform for the equipment; a turbine engine is arranged in the same straight line with a reduction gearbox, a drive shaft is disposed between the reduction gearbox and the plunger pump, and the angle of the drive shaft is between 2° and 4°, ensuring stable and efficient transmission of the turbine engine, thus reducing the incidence of failure; a lubrication system is driven by an auxiliary power system to ensure that the turbine engine, the reduction gearbox and the plunger pump all run under appropriate circumstances, and a dual lubrication system ensures that the plunger pump achieves a power operation continuously at 5000 HP or above; with all the above technical means, the requirements of continuous high-power operations for the fracturing equipment would finally be satisfied.

The objective of the present invention is achieved by the following technical measures: a continuous high-power turbine fracturing equipment, including a turbine engine, a reduction gearbox, a drive shaft and a plunger pump, the turbine engine is arranged in the same straight line with the reduction gearbox, the reduction gearbox is connected to the plunger pump through the drive shaft, and the angle of the drive shaft is between 2° and 4°.

Further, the power of the plunger pump is 5000 LIP or above.

Further, the plunger pump is a five-cylinder plunger pump.

Further, the continuous high-power turbine fracturing equipment includes a chassis, the turbine engine, the reduction gearbox, the drive shaft and the plunger pump are disposed on the chassis, and T1 high strength structure steel is employed as the material of the chassis.

Further, the number of axles of the chassis is 3 or above.

Further, the continuous high-power turbine fracturing equipment includes an auxiliary power system and a lubrication system. The auxiliary power system provides power to the lubrication system, the lubrication system includes a lubrication unit for the turbine engine, a lubrication unit for the reduction gearbox and a lubrication unit for the plunger pump. The lubrication unit for the plunger pump includes a high pressure lubrication unit and a low pressure lubrication unit.

Further, the high pressure lubrication unit includes a high pressure motor, a high pressure pump and a high pressure oil line. The high pressure motor drives the high pressure pump, which pumps high pressure lubricating oil into the high pressure oil line.

Further, the high pressure oil line is used for lubricating the connecting rod bearing bushes and the crosshead bearing bushes in the plunger pump.

Further, the low pressure lubrication unit includes a low pressure motor, a low pressure pump and a low pressure oil line. The low pressure motor drives the low pressure pump, which pumps low pressure lubricating oil into the low pressure oil line.

Further, the low pressure oil line is used for lubricating the crankshaft bearings, the crosshead sliding rails, the reduction gearbox bearing and the reduction gearbox gear pair in the plunger pump.

Further, at an oil inlet of the low pressure oil line, independent lubricating oil lines are respectively arranged for the reduction gearbox bearing and the reduction gearbox gear pair.

Further, the auxiliary power system is a diesel engine, or a gas turbine, or an electromotor.

Further, the auxiliary power system is disposed on a gooseneck of the chassis.

Further, there is a torque limiter disposed on the reduction gearbox, ensuring the torque not too large to damage the turbine engine.

Further, the turbine engine employs 100% of natural gas or diesel as fuel.

Further, the continuous high-power turbine fracturing equipment includes an air intake system, which includes air intake filters and air intake pipings, the air intake filters are connected to the air inlet of the turbine engine through the air intake pipings.

Further, the air intake filters are in V-shaped structures.

Further, the continuous high-power turbine fracturing equipment includes an exhaust system, which is connected to the exhaust port of the turbine engine.

Further, there is a rain cap disposed at the exhaust end of the exhaust system, the rain cap is hinged to the exhaust end of the exhaust system and the opening of the rain cap faces away from the turbine engine.

Further, there is an electric capstan disposed between the rain cap and the exhaust end of the exhaust system to achieve the rotary opening-closing of the raincap around the hinge point, with the rotation angle greater than 0° and less than 90°.

Further, the opening-closing angle of the rain cap is 85°.

Compared with the prior art, the present invention has the following beneficial effects: providing a continuous high-power turbine fracturing equipment, in which chassis T1 materials are selected to provide a stable working platform for the equipment; the turbine engine is arranged in the same straight line with the reduction gearbox, the drive shaft is disposed between the reduction gearbox and the plunger pump, and the angle of the drive shaft is between 2° and 4°, ensuring stable and efficient transmission of the turbine engine, thus reducing the incidence of failure; a lubrication system is driven by an auxiliary power system to ensure that the turbine engine, the reduction gearbox and the plunger pump all run under appropriate circumstances, and a dual lubrication system ensures that the plunger pump achieves a power operation continuously at 5000 HP or above; with all the above technical means, the requirements of continuous high-power operations for the fracturing equipment would finally be satisfied.

The present invention will be illustrated in detail below with reference to accompanying drawings and the detailed description.

Wherein, 1. chassis, 2. auxiliary power system, 3. the first hydraulic pump, 4. exhaust system, 5. air intake system, 6. turbine engine, 7. reduction gearbox, 8. drive shaft, 9. plunger pump, 10. air intake filters, 11. rain cap, 12. electric capstan, 13. connecting rod bearing bushes, 14. crosshead bearing bushes, 15. crankshaft bearings, 16. crosshead upper sliding rails, 17. crosshead lower sliding rails, 18. reduction gearbox gear pair, 19. reduction gearbox bearing, 20. high pressure oil line, and 21. low pressure oil line, 22. torque limiter, 23. high pressure pump, 24. high pressure motor, 25. low pressure pump, 26. low pressure motor, 50. Cooler, 51. Lubrication unit for turbine engine, and 52. Lubrication unit for gearbox.

DESCRIPTION OF THE EMBODIMENTS

Figure 1:
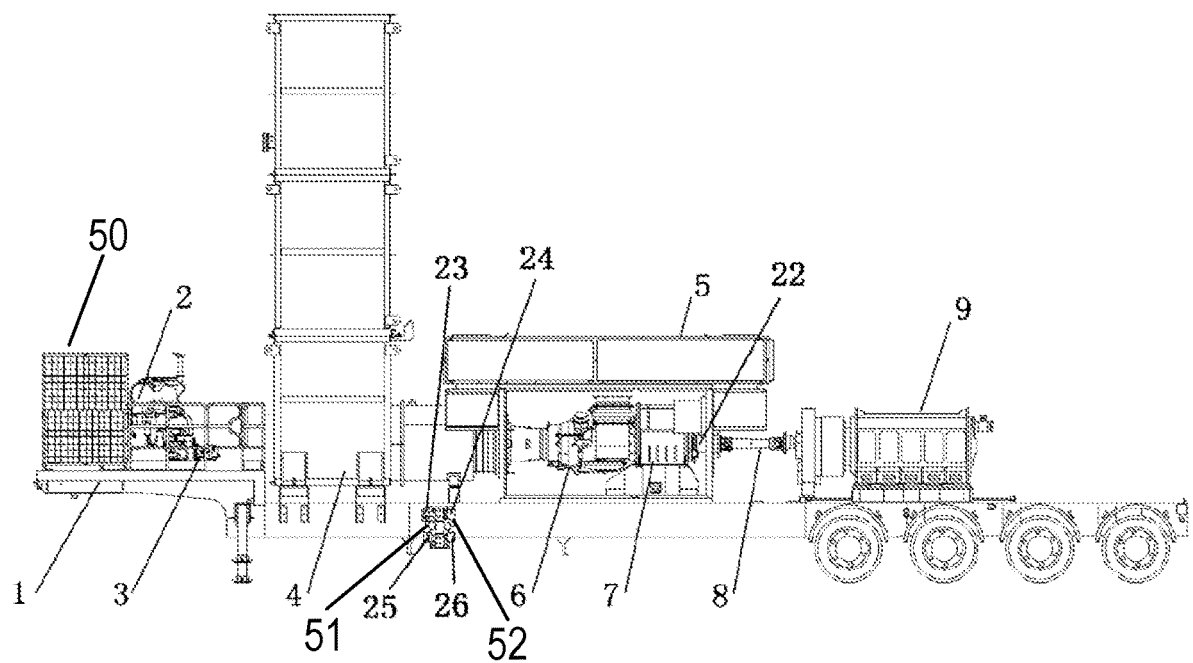
FIG. 1 is a schematic structural diagram of a continuous high-power turbine fracturing equipment.
Figure 2:
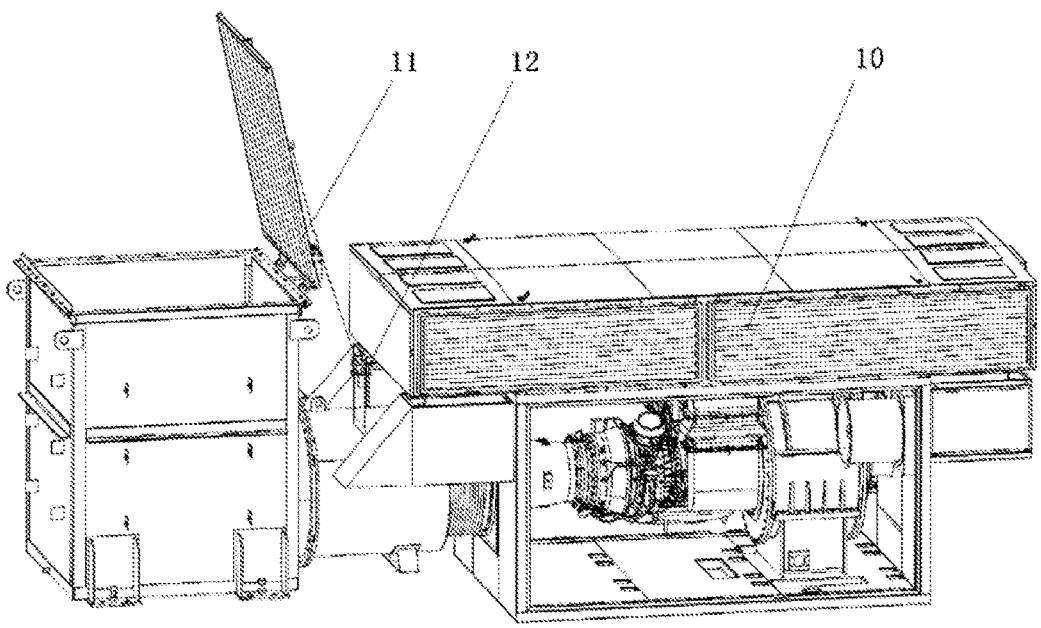
FIG. 2 is a schematic structural diagram of an exhaust system.
Figure 3:
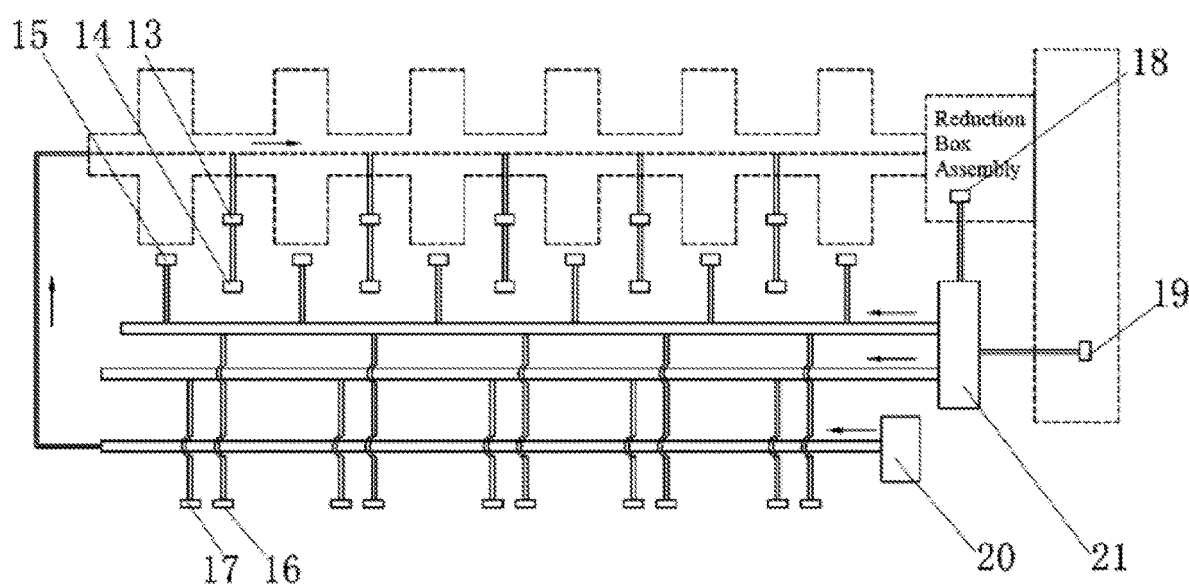
FIG. 3 is a schematic diagram of lubrication in the plunger pump.

As shown in FIGS. 1 to 3, a continuous high-power turbine fracturing equipment, including a turbine engine 6, a reduction gearbox 7, a drive shaft 8 and a plunger pump 9, the turbine engine 6 is arranged in the same straight line with the reduction gearbox 7, the reduction gearbox 7 is connected to the plunger pump 9 through the drive shaft 8, and the angle of the drive shaft 8 is between 2° and 4°, ensuring stable and efficient transmission of the turbine engine 6, thus reducing the incidence of failure.

The power of the plunger pump 9 is 5000 HP or above. The plunger pump 9 is a five-cylinder plunger pump. The output of the high-power plunger pump 9 provides basic conditions for the continuous high-power turbine fracturing equipment.

The continuous high-power turbine fracturing equipment includes a chassis 1, the turbine engine 6, the reduction gearbox 7, the drive shaft 8 and the plunger pump 9 are disposed on the chassis 1. T1 high strength structure steel is employed as the material of the chassis 1, ensuring the stability of the chassis 1, providing a reliable working platform for the stable operations of the turbine engine 6 and the high-power plunger pump 9.

The number of axles of the chassis 1 is 3 or above, ensuring sufficient supporting capacity.

The continuous high-power turbine fracturing equipment includes an auxiliary power system 2 and a lubrication system, the auxiliary power system 2 provides power to the lubrication system. The lubrication system includes three lubrication units, which are the lubrication unit for the turbine engine, the lubrication unit for the reduction gearbox and the lubrication unit for the plunger pump, respectively. The lubrication unit for the turbine engine is used for lubricating the turbine engine 6, the lubrication unit for the reduction gearbox is used for lubricating the reduction gearbox 7, and the lubrication unit for the plunger pump includes a high pressure lubrication unit and a low pressure lubrication unit. The function of the lubrication system is to lubricate and cool the turbine engine 6, the reduction gearbox 7, and the plunger pump 9, thus ensuring their stable operations. The lubrication system includes components such as a cooler, a first hydraulic pump 3, a pressure gage, a safety valve, and so on. The cooler cools the lubricating oil, ensuring the oil entering each lubrication unit at normal temperature to provide sufficient lubricating properties. The first hydraulic pump 3 provides power to each lubrication unit. The pressure gage is used to monitor the pressure of the lubricating oil in the whole lubrication system. The safety valve ensures stable operations of the lubrication system.

The high pressure lubrication unit includes a high pressure motor, a high pressure pump and a high pressure oil line 20. The high pressure motor drives the high pressure pump, which pumps high pressure lubricating oil into the high pressure oil line 20. The high pressure oil line 20 is used for lubricating the connecting rod bearing bushes 13 and the crosshead bearing bushes 14 in the plunger pump 9. The low pressure lubrication unit includes a low pressure motor, a low pressure pump and a low pressure oil line 21. The low pressure motor drives the low pressure pump, which pumps low pressure lubricating oil into the low pressure oil line 21. The low pressure oil line 21 is used for lubricating the crankshaft bearings 15, the crosshead sliding rails, the reduction gearbox bearing 19 and the reduction gearbox gear pair 18 in the plunger pump 9. The crosshead sliding nails include crosshead upper sliding rails 16 and crosshead lower sliding rails 17. By providing oil for lubrication with the dual lubricating oil line, different lubrication demands at each lubricating point in the plunger pump 9 would be satisfied; two oil pumps (a high pressure pump and a low pressure pump) are employed to supply oil so that the oil supply of each oil line could be better guaranteed, thus better distributing the lubricating oil, and avoiding problems of uneven distribution of lubricating oil caused by excessive lubrication branches and insufficient amount of lubricating oil at each lubricating point, thus enhancing the utilization of lubricating oil, reducing abnormalities, and better assisting the continuous stable operations of the high-power plunger pump 9. For the connecting rod bearing bushes 13 and the crosshead bearing bushes 14, the fit clearance is small, the carried load is high, the contact area is large, and the requirements on lubrication are high. However, for the crankshaft bearings 15, the crosshead sliding rails, the reduction gearbox bearing 19 and the reduction gearbox gear pair 18, by contrast, the requirements on lubrication are low.

At an oil inlet of the low pressure oil line 21, independent lubricating oil lines are respectively arranged for the reduction gearbox bearing 19 and the reduction gearbox gear pair 18. The rotation rates of the reduction gearbox bearing 19 and the reduction gearbox gear pair 18 are high, each of which is supplied with oil independently, which can guarantee sufficient lubricating oil for effectively establishing oil films, rapidly taking away the heat resulting from friction, and improving the life time.

There are a filter, an overflow valve and the like disposed on the respective oil supply line of the high pressure oil line 20 and the low pressure oil line 21. The rated lubricating oil pressure of the high pressure oil line 20 is 200-350 PSI. The rated lubricating oil pressure of the low pressure oil line 21 is 60-150 PSI.

The auxiliary power system 2 is a diesel engine, or a gas turbine, or an electromotor.

The auxiliary power system 2 is disposed on a gooseneck of the chassis 1, optimizing the configuration form of each component of the equipment on the chassis 1.

There is a torque limiter disposed on the reduction gearbox 7, ensuring the torque not too large to damage the turbine engine 6.

The turbine engine 6 employs 100% of natural gas or diesel as fuel.

The continuous high-power turbine fracturing equipment includes an air intake system 5, which includes air intake filters 10 and air intake pipings, the air intake filters 10 are connected to the air inlet of the turbine engine 6 through the air intake pipings. The air intake system 5 is integrated on the same chassis 1, increasing the ease of use of the continuous high-power turbine fracturing equipment, reducing the transportation cost, without the need of field connection and assembly.

A chamber is disposed outside the turbine engine 6, the air intake filters 10 are disposed on the chamber, and the air intake filters 10 are in V-shaped structures, which means that the cross sections of the air intake filters 10 are in V-shapes, which are different from the existing planar structures in larger contact area, thus increasing the air intake area, decreasing the flow rate of the air inflow, extending the life time of the air intake filters 10, better matching the desired air amount of the turbine engine 6, and promoting the stable output of the turbine engine 6.

The continuous high-power turbine fracturing equipment includes an exhaust system 4, which is connected to the exhaust port of the turbine engine 6. The exhaust system 4 is integrated on the same chassis 1, increasing the ease of use of the continuous high-power turbine fracturing equipment, reducing the transportation cost, without the need of field connection and assembly.

The exhaust end of the exhaust system 4 is provided with a rain cap 11, the rain cap is hinged to the exhaust end of the exhaust system 4 and the opening of the rain cap faces away from the turbine engine 6. The exhaust end of the exhaust system 4 is in a type of opening, if it rains, the rainwater would accumulate in the exhaust system 4, more seriously flow backward into and damage the turbine engine 6. The addition of rain cap 11 can effectively avoid this. Moreover, the opening of rain cap 11 faces away from the turbine engine 6, thus preventing the discharged exhaust from being inhaled by the air intake system 5 of the turbine engine 6.

The rain cap 11 is hinged to the exhaust end of the exhaust system 4 through an electric capstan 12 to achieve the rotary opening-closing of the rain cap 11 around the hinge point, with the rotation angle greater than 0° and less than 90°. The opening-closing angle of the rain cap 11 is 85°. The rain cap 11 can be completely closed in non-working state or on rainy days, that is 0° status; and can be opened in working state, preferably open up to 85°, ensuring that the rain cap 11 can be opened and closed smoothly by the electric capstan 12.

It will be appreciated to persons skilled in the art that the present invention is not limited to the foregoing embodiments, which together with the context described in the specification are only used to illustrate the principle of the present invention. Various changes and improvements may be made to the present invention without departing from the spirit and scope of the present invention. All these changes and improvements shall fall within the protection scope of the present invention. The protection scope of the present invention is defined by the appended claims and equivalents thereof.

The invention claimed is:

1. A turbine fracturing equipment, comprising a lubrication system, which comprises a first lubrication unit configured to lubricate a plunger pump;
wherein:
the first lubrication unit comprises a first motor, a first pump, and a first oil line, the first motor is configured to drive the first pump, which is configured to pump lubricating oil of a first pressure into the first oil line;
the first oil line is configured to lubricate crankshaft bearing, crosshead sliding rails, bearings and gears of a reduction gearbox in the plunger pump;
at an oil inlet of the first oil line, independent lubricating oil lines are respectively arranged for the bearings and the gears of the reduction gearbox in the plunger pump;
the turbine fracturing equipment further comprises a turbine engine and an exhaust system connected to an exhaust port of the turbine engine;
an exhaust end of the exhaust system is provided with a rain cap, the rain cap being configured to be hinged to the exhaust end and rotate along the exhaust end of the exhaust system with a rotation angle between 0° and 90° after obtaining power provided by an electric capstan; and
the turbine fracturing equipment comprises a torque limiter disposed between the turbine engine and the plunger pump for limiting an amount of torque.

2. The turbine fracturing equipment of claim 1, wherein the rotation angle is 85°.

3. The turbine fracturing equipment of claim 1, wherein the lubrication system comprises a cooler and a first hydraulic pump.

4. The turbine fracturing equipment of claim 1, wherein the crosshead sliding rails comprise crosshead upper sliding rails and crosshead lower sliding rails.

5. The turbine fracturing equipment of claim 1, further comprising a second lubrication unit, wherein:
the second lubrication unit comprises a second motor, a second pump, and a second oil line, and
the second motor is configured to drive the second pump, which is configured to pump lubricating oil having a second pressure into the second oil line, the second pressure being higher than the first pressure.

6. The turbine fracturing equipment of claim 5, wherein the second oil line is configured to lubricate at least one of connecting rod bearing bushes and crosshead bearing bushes in the plunger pump.

7. The turbine fracturing equipment of claim 1, wherein the lubrication system further comprises a second lubrication unit configured to lubricate the turbine engine.

8. The turbine fracturing equipment of claim 7, wherein the lubrication system further comprises a third lubrication unit configured to lubricate an external reduction gearbox.

9. The turbine fracturing equipment of claim 8, further comprising an auxiliary power system, wherein the auxiliary power system is configured to provide power to the lubrication system.

10. The turbine fracturing equipment of claim 9, wherein the auxiliary power system comprises a diesel engine, a gas turbine, or an electromotor.

11. The turbine fracturing equipment of claim 9, further comprising a chassis, wherein the turbine engine, the external reduction gearbox, and the plunger pump are disposed on the chassis, and the chassis is made of material comprising T1 high strength structure steel.

12. The turbine fracturing equipment of claim 11, further comprising a transmission shaft between the external reduction gearbox and the plunger pump,
wherein the turbine engine is arranged coaxially with the external reduction gearbox around a common straight axis; and
an angle between the transmission shaft and the common straight axis is between 2° and 4°, inclusive.

13. The turbine fracturing equipment of claim 11, wherein the auxiliary power system is disposed on a gooseneck of the chassis.

14. The turbine fracturing equipment of claim 11, wherein the rain cap is configured to open in a direction away from the turbine engine.

15. The turbine fracturing equipment of claim 11, wherein the turbine engine employs 100% of natural gas or diesel as fuel.

16. The turbine fracturing equipment of claim 11, further comprising an air intake system, which comprises air intake filters and air intake pipes, wherein the air intake filters are connected to air inlets of the turbine engine through the air intake pipes.

17. The turbine fracturing equipment of claim 16, wherein the air intake filters are in V-shaped structures.

18. The turbine fracturing equipment of claim 11, wherein a power of the plunger pump is rated at 5000 HP.

19. The turbine fracturing equipment of claim 18, the plunger pump comprises a five-cylinder plunger pump.

\* \* \* \* \*